March 14, 1967 W. W. WARD 3,308,988
CUP DISPENSER AND MAGAZINE
Filed April 12, 1965 2 Sheets-Sheet 1
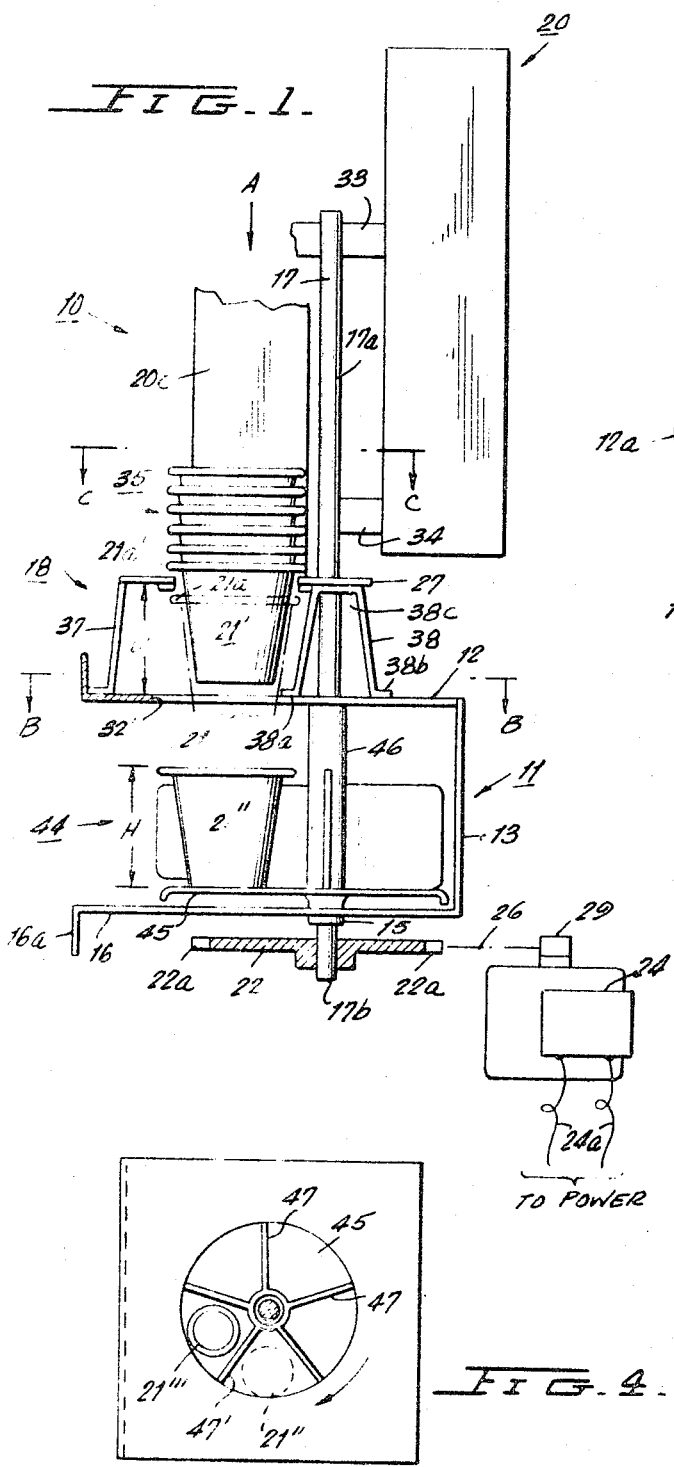
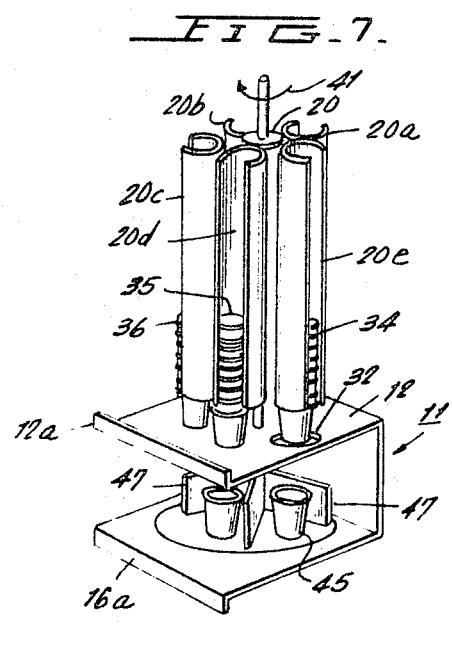
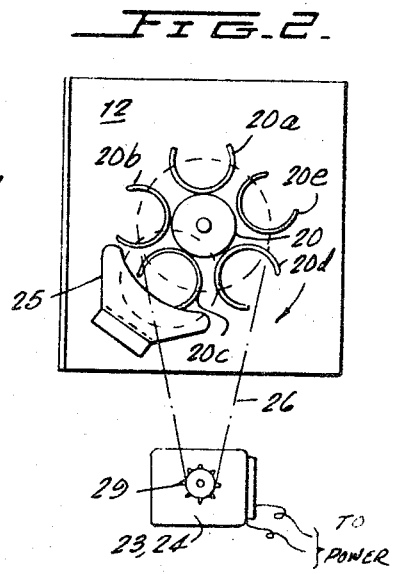
INVENTOR
WALLACE W. WARD
OSTROLENK, FABER, GERB & SOFFEN
ATTORNEYS 
United States Patent Office 3,308,988  
Patented Mar. 14, 1967

3,308,988  
CUP DISPENSER AND MAGAZINE  
Wallace W. Ward, 28 Long Hill Lane,  
Chatham, N.J. 07928  
Filed Apr. 12, 1965, Ser. No. 447,176  
2 Claims. (Cl. 221—113)

The instant invention relates to automatic vending machines and more particularly to a cup dispenser and magazine assembly for automatic vending machines arranged to provide downward delivery of cups and theft preventative means, all of which are operated by single rotary driving means.

While the instant invention is applicable to machines for automatically vending hot coffee and/or similar beverages, more specifically its design is adapted for the purposes of providing a machine for service in what is commonly referred to in the trade as a marginal location. Such locations are characterized by a sales demand of from 250 to 500 beverage cups per week, or an amount in that general range. This is in contrast to machines located in areas where the demand is typically 500 to 1000 cups per day.

While the automatic vending machine operation is basically the same in both marginal and above marginal area machines, there are many factors which become significant in machines employed in marginal locations which are basically of no concern in machines which are adapted to service 500 to 1000 cups per day.

Due to the fact that a marginal machine requires a significantly longer period of time before it depletes its coffee or beverage supply, such machines must be designed so as to:

Employ powdered or liquid coffee or flavor syrup in the case of carbonated beverages;

Employ powdered cream substitute commonly referred to as whiteners since real milk or cream must be refrigerated and must also be attended daily to insure against souring;

Employ a liquid sugar syrup;

Be as nearly self-contained and independent of plumbing and drains as is possible;

Provide a low power drain electric heating means;

Be relatively simple in construction so as to require a minimum amount of servicing;

Be dependable and consistent in delivery, even after extended periods of inattention and/or disuse;

Be basically of a nature which can be manufactured at relatively low cost thus permitting easy amortization of such machines even in the light of low sales volume.

It is therefore a primary object of the instant invention to provide a novel cup dispenser and magazine assembly for use in vending machines of all types and more particularly for use in vending machines which may be employed in marginal locations. Such use may be both mechanically and economically justified due to the relatively simple design of the instant invention; its ease and low cost in the manufacturing and assembly thereof and its relatively low maintenance cost together with the ability to provide an assembly capable of housing an extremely large number of cups to be dispensed as well as providing a theft thwarting assembly to prevent the theft of cups especially in locations which may go unattended for long periods of time.

The instant invention is comprised of a cup magazine assembly which has a plurality of vertically aligned magazine holders all of which are arranged to dispense a cup in sequential fashion so that all cup stacks are depleted at an equal rate.

The cups are delivered to a first or upper platform or station comprising means for isolating the lowermost cup contained in a magazine from the next cup immediately above, when the magazine moves into a position immediately above the upper platform assembly. The isolating means is further provided with first and second bias means for urging the cup in the downward vertical direction and away from the magazine as said magazine rotates relative to the isolating means. Suitable means are provided for delivering the cup which has been thrust downwardly to the delivery position where the ingredients are introduced to the cup and also to the position wherein the cup is accessible to the vending machine user and may be removed therefrom upon completion of the delivery and mixing operation. The means for delivering the cup to the removal or lower platform station may, for example, be a chute or guide means, guiding the cup to the appropriate position.

In applications where it is desired to provide means for thwarting the theft of one or more cups, a revolving platform means is provided for receiving the delivered cup. The platform means is provided with a base member having a plurality of partitions or walls arranged in radial fashion around the platform means. After the isolated cup has been thrust downwardly and delivered to the revolving platform means the platform continues rotation to a position which is a predetermined angular distance from the opening provided in the upper platform means. The walls or partitions of the revolving platform means act to prevent ingress by the hand or otherwise from the exterior of the vending machine to the opening in the upper platform assembly where the cups are stored.

The arrangement of the instant invention is such that rotational movement of the revolving platform means and the magazine assembly is sufficient for the purpose of performing all of the above mentioned operations. The revolving platform means and magazine assembly are both concentrically aligned with and coupled to a single shaft means which, in turn, is driven by a single prime moving means. Thus a single drive means capable of providing a rotational driving force is sufficient for activating the cup dispenser and magazine assembly to perform all of the above-mentioned functions.

It is therefore one object of the instant invention to provide a novel cup dispenser and magazine assembly for use in vending machines and the like.

Another object of the instant invention is to provide a novel cup dispenser and magazine assembly capable, upon rotation thereof, of delivering cups on a one at a time basis.

Still another object of the instant invention is to provide a novel cup dispenser and magazine assembly for use in vending machines and the like comprising novel isolation means having bias means for isolating and delivering a single cup to a delivery station purely upon rotation of said magazine assembly.

Still another object of the instant invention is to provide a novel cup dispenser and magazine assembly for use in vending machines and the like wherein the magazine assembly is comprised of a plurality of magazines arranged in substantially annular fashion, each adapted for receiving a stack of cups and designed to dispense cups sequentially from the magazine assembly.

Still another object of the instant invention is to provide a novel cup dispenser and magazine assembly for use in vending machines and the like comprising a novel revolving platform means arranged to deliver a dispensed cup to a delivery station for receipt of the beverage ingredients and further to thwart stealth of cups from the magazine assembly.

Still another object of the instant invention is to provide a novel cup dispenser and magazine assembly for use in vending machines and the like comprising a novel revolving platform means arranged to deliver a dispensed cup to a delivery station for receipt of the beverage ingredients and further to thwart stealth of cups from the magazine assembly and wherein said revolving platform means and said magazine assembly are both designed to be rotated by a single drive means.

These and other objects of the instant invention will become apparent when reading the accompanying description and drawings in which:

FIGURE 1 is an elevational view partially sectionalized showing a cup dispenser and magazine assembly designed in accordance with the principles of the instant invention.

FIGURE 2 shows a view of the cup dispenser and magazine assembly of FIGURE 1 taken along the lines b—b of FIGURE 1.

FIGURE 4 is a view of the cup dispenser and magazine assembly taken along the lines d—d.

FIGURE 7 is a perspective view of the cup dispenser and magazine assembly of FIGURES 1–6.

Figure 3:
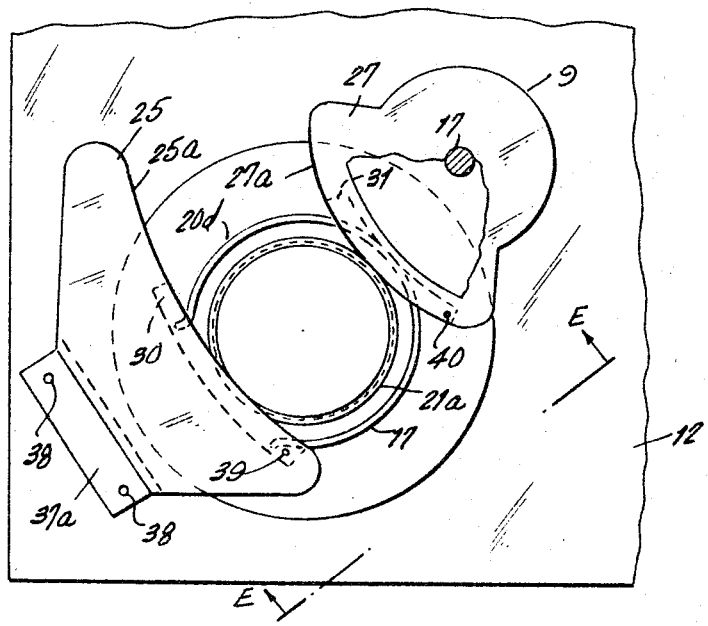
FIGURE 3 shows a view of the cup dispenser and magazine assembly of FIGURE 1 taken along the lines c—c of FIGURE 1.

Referring now to the drawings and more particularly to FIGURES 1 and 7, there is shown therein a cup dispenser and magazine assembly 10 comprised of a substantially U-shaped bracket for support member 11. The support member has a central portion 13 which is vertically aligned and which is provided with arms 12 and 16 which are horizontally aligned. The arm or portion 12 serves as the base of an upper platform and is provided with an aperture 32 therein for delivering cups from the magazine assembly to the delivery station. The outwardly extended flanges 12a and 16a of arms 12 and 16, respectively, may be secured in any well known manner to the interior of the vending machine housing (not shown), for example. The arms or portions 12 and 16 are further provided with suitable openings (not shown) for receiving therethrough a vertically aligned shaft 17. The flat portion 16 of support member 11 is further provided with a bearing member 15 along the underside thereof and in alignment with the opening receiving shaft 17 for the purpose of vertically positioning and supporting shaft 17 in the positions shown in FIGURES 1 and 7. The bearing 15 operates so as to prevent any movement of shaft 17 in the longitudinal direction, but freely permit rotation of shaft 17 about its longitudinal axis 17a. The lower end 17b of shaft 17 extends below bearing member 15 and has rigidly secured thereto a sprocket member 22 provided with suitable teeth 22a around the periphery thereof. The sprocket teeth 22a mesh with a chain drive 26 through which movement is imparted by a motor means 23 having a similar sprocket 29 for imparting rotation to chain drive 26. The motor 23 is under control of a motor control means 24 which, in turn, is connected to a suitable power source via leads 24a. Under normal operation the vending machine user makes the drink selection and deposits a coin. The deposit of the coin in the registry of the drink selection automatically energizes the motor control means which, in turn, energizes motor 23 during at least one phase of the operation of the vending machine in order to impart rotation to sprocket 29. This rotation is coupled through chain drive 26 to sprocket 22 which, in turn, imparts this rotation to the vertically aligned shaft 17.

The upper portion 12 of the bracket support 11 acts as the base or support for cup isolation and delivery means 18 which operates in a manner to be more fully described. Immediately above the cup isolation and delivery means a cup magazine assembly 20 is provided.

The magazine assembly 20 is comprised of an upper and lower substantially annular bracket arrangement 33 and 34 which is rigidly secured to the vertical shaft 17. A plurality of individual magazines 20a–20e are rigidly secured in a circular array about the annular bracket members 33 and 34. Each of the individual magazine members 20a–20e are elongated tube like members having a substantially C-shaped configuration in that they are not complete hollow cylinders. The inner radius of each magazine is of a dimension suitable to position a stack of cups such as, for example, the cup stacks 34, 35 and 36, which can best be seen in FIGURES 1 and 7. While the cup stacks are contained within an assocated magazine member the cups are free to experience downward, vertical motion since any frictional engagement between the cup stacks and their associated magazine members is relatively insignificant. The C-shaped configuration of each magazine member 20a–20e is preferred in that it permits immediate and simple visual observation of the contents of the magazine members allowing for the replenishing of cups within each magazine member if and when each of the magazine members have substantially depleted their stack of cups.

The annular shaped bracket members 33 and 34, being rigidly secured to vertical shaft 17, will rotate upon rotation of shaft 17 enabling performance of the cup isolation and delivery operations to be more fully described.

The cup isolation and delivery assembly 18 is comprised of first and second blade members 25 and 27 which can best be seen in FIGURES 1, 3, 5 and 6. The blade member 25 is secured to the upper portion 12 of bracket support 11 by means of a supporting bracket 37 secured at its upper end to blade member 25 and having a flange 37a at its lower end arranged for securement to member 12 by fastening means 38. The blade member 27 is provided with a substantially U-shaped bracket 38 having its central portion 38c positioning and supporting blade member 27 and having flanges 38a–38b secured to the portion 12 of bracket 11 in any suitable manner. Bracket 38 and blade member 28 are provided with suitable apertures to permit the passage therethrough of shaft member 17.

Blade member 25 has a concave blade edge 25a while blade member 27 has a convex blade edge 27a. The distance D representing the distance from the upper surface of member 12 to the blade members 25 and 27 is so chosen as to be slightly greater than the total height H of a cup such as, for example, the cup 21a of FIGURE 1. Both of the blade members 25 and 27 are formed of a substantially thin sheet of material such as, for example, sheet steel, so that the distance between the lip 21a of the cup 21 about to be dispensed and the lip 21a' of the cup 21 immediately above the cup to be dispensed (see FIGURE 1) is such that the blade members 25 and 27 will enter the region between the lips 21a and 21a'.

Figure 5:
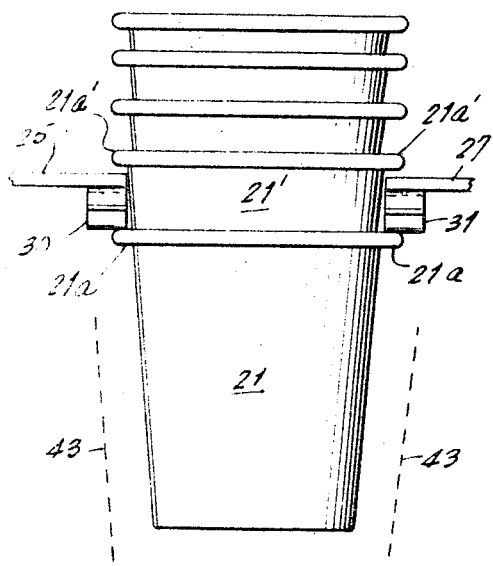
FIGURE 5 is an elevational view of the isolation means and cup delivery means of FIGURE 3 looking in the direction of the lines e—e.
Figure 6:
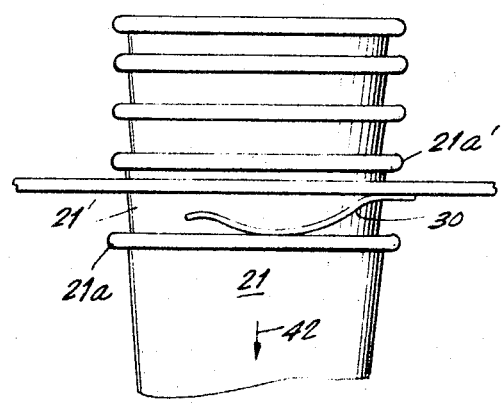
FIGURE 6 is an elevational sectionalized detailed view of one blade of the isolated means of FIGURE 3.

Both of the blade members 25 and 27 are provided with biasing spring members 30 and 31, respectively, which can best be seen in FIGURES 3, 5 and 6 and which spring members are mounted immediately adjacent the blade edges of their associated blade members. Both spring members are formed of a suitable spring steel and have a substantially serpentine configuration which can best be seen in FIGURE 6. Spring member 30 is secured at 39 to its blade member 25 while spring member 31 is secured at 40 to its blade member 27, securement being effected by any suitable fastening means such as, a rivet, for example.

The operation of the cup dispenser and delivery arrangement is as follows:

When a drink selection and a deposit of the necessary coinage has been performed by the vending machine user, this causes the motor control means 24 to be actuated which, in turn, operates the motor means 23 through at least one phase of the vending machine operation. Energization of motor means 23 causes rotation of the sprocket 29 which, in turn, through chain drive 26, causes rotation of the vertically aligned shaft 17. This rotation which is designated by the arrow 41 of FIGURE 7 causes the magazine member 20d to move away from the isolation and delivery assembly 18 and causes the magazine 20c to move into alignment with the isolation and delivery means. In moving into such alignment the lowermost cup 21' of the magazine member 20c is isolated from the cup 21' immediately above the cup 21 by means of the blade members 25 and 27. This arrangement permits only the cup 21 to be delivered from the magazine member to the delivery or access point and likewise prevents any additional cups from being so delivered during a single vending machine operation.

As the magazine member 20c comes closer to alignment with the isolation and delivery assembly 18, lip 21a of the cup 21 comes into engagement with the spring biasing members 30 and 31 which can best be seen in FIGURE 5. As the magazine member 20c comes still further into alignment with the isolation and delivery assembly 18 the lip 21a of the cup 21 moves to the position shown in FIGURE 6. In this position it can be seen that the cup 21 is arranged in the downward vertical direction as indicated by the arrow 42 of FIGURE 6. This movement, in addition to moving cup 21 downward and away from the blade members 25 and 27 likewise moves cup 21 downward and away from its neighboring cup 21'. This movement releases cup 21 from any frictional engagement which it may experience with cup 21' and places the cup completely under control of the downward thrust imparted thereto by the spring members 30 and 31.

When the downward thrust becomes the controlling force upon the cup 21, the cup is then dropped due to gravitational forces as well as the thrust imparted thereto by the spring members through the opening 32 provided in upper portion 12 of bracket support 11.

In the first embodiment the cup will be delivered so that it will be deposited upon the upper surface of the portion 16 of bracket support 11. A suitable guiding chute 43 (see FIGURE 5) may be provided to insure the fact that the cup will be deposited upon the surface of portion 16 in the upright position.

In applications where it becomes necessary to provide a stealth prevention means, the delivery means 44 may be employed. The delivery means 44 can best be seen in FIGURES 1, 4 and 7 and is comprised of a platform member 45 having rigidly secured thereto a tubular member 46 which is so arranged as to receive the vertically aligned shaft 17 therethrough. It should be understood that the revolving platform member 45 is provided with a suitable aperture for receiving the vertically aligned shaft 17. The tubular member 46, in addition to being rigidly secured to platform member 45, is also rigidly secured to vertical shaft 17. A plurality of partitions or walls 47 arranged in a radial fashion about the tubular member 46 are rigidly secured to both the tubular member 46 and the revolving member 45 so as to form a plurality of cup receiving compartments upon the revolving member 45.

The operation of the cup stealth prevention means is as follows:

Upon energization of the motor means 23, rotation of the sprocket 29 is imparted through chain drive 26 to the sprocket 22 causing shaft 17 and hence tubular member 46 to undergo rotation. This rotation is imparted to the partitions or walls 47 as well as the revolving table member 45. When a cup has been delivered from the cup stack so that it arrives at the position shown by cup 21' of FIGURE 1, it can clearly be seen that the cup is in an upright position and resting upon the upper surface of revolving platform member 45 as well as being located between two of the partitions or walls 47. The rotation of the cup dispenser and magazine assembly continues until the cup which initially occupied the dotted line position 21" of FIGURE 4 moves to the delivery or access position 21''' of FIGURE 4. In this position, the wall designated 47' in FIGURE 4 acts as a barrier to prevent the ingress of the operator's hand from the machine access position over the barrier wall 47' and through the opening 32 in upper portion 12 of bracket support 11 so as to prevent any unused cups from the magazine from being removed from the machine to the exterior thereof. The height of the partitions or walls 47 may be so selected as to prevent any such unwanted ingress into the machine proper. When the cup is in the access or delivery position 21''' of FIGURE 4 this indicates the position wherein the ingredients may be delivered to the cup for mixing of the drink and eventually removal of the cup and its ingredients from the forward end of the vending machine. It should also be understood that the magazine racks will operate in such a manner that only one cup will be delivered from each magazine member and that a cup will be delivered from each neighboring magazine member before the next cup is delivered from the magazine member which has delivered the very first cup. For example, let it be assumed that magazine member 28 delivers the first cup. Starting with this as the initial operation, magazine members 20b–20e will all deliver one cup in a sequential fashion before magazine member 20a delivers its second cup. Thus, all of the magazine members will deplete cups in a substantially equal number through total revolution of the magazine assembly 20. Thus no problem can ever arise as regards the emptying of a single magazine member well ahead of its neighboring magazine members. It should further be noted that the isolation, downward thrust and movement of the delivered cup to the delivery or access position all takes place under the control of a single driving means, namely motor 23 even though movement other than rotational movement takes place during the cup isolation and delivery operations.

It can therefore be seen that the instant invention provides a novel cup dispenser and magazine assembly capable of storing an extremely large number of cups arranged in a plurality of stacks; permits the delivery of only one cup at a time; depletes all of the individual cup magazine members in a substantially equal manner; provides a novel stealth thwarting means and performs all of these functions with a relatively simple arrangement from the viewpoint of economics as well as fabrication, assembly and maintenance thereof.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Dispensing means for drinking cups and the like comprising rotatably mounted magazine means for receiving and positioning a stack of cups; stationary isolating means positioned beneath said magazine means for isolating the lowermost cup in a stack of cups from the next higher cup in the stack of cups, in readiness for the delivery operation, when said magazine means rotates in alignment with said isolating means; stealth prevention means positioned beneath said stationary isolating means and comprising rotatably mounted platform means including a plurality of partition means arranged to define a plurality of compartments of similar configuration and dimensionally sufficient to receive a drinking cup in an upright position; means for rotating said rotatably mounted magazine means and said platform means to transport the compartment containing the upright drinking cup beneath said isolating means to a delivery position angularly displaced from said isolating means where the cup may be removed by the vending machine operator at the same time as said rotatably mounted magazine means is rotated to dispense a succeeding cup; said partitions being of sufficient height to prevent ingress into the magazine means through said delivery station thereby preventing the stealth of cups stored in said magazine means.

2. Dispensing means for drinking cups and the like comprising rotatably mounted magazine means for receiving and positioning a stack of cups; stationary isolating means positioned beneath said magazine means for isolating the lower most cup in a stack of cups from the next higher cup in the stack of cups, in readiness for the delivery operation, when said magazine means rotates in alignment with said isolating means; said isolating means comprising a pair of blade members and bias means positioned on the under surface of said blade members for thrusting said lowermost cup downwardly and away from its associated cup stack as said magazine means rotates into alignment with said isolating means; stealth prevention means positioned beneath said stationary isolating means and comprising rotatably mounted platform means including a plurality of partition means arranged to define a plurality of compartments of similar configuration and dimensionally sufficient to receive a drinking cup in an upright position; means for rotating said rotatably mounted magazine means and said platform means to transport the compartment containing the upright drinking cup from beneath said isolating means to a delivery position angularly displaced from said isolating means where the cup may be removed by the vending machine operator at the same time as said rotatably mounted magazine means is rotated to dispense a succeeding cup; said partitions being of sufficient height to prevent ingress into the magazine means through said delivery station thereby preventing the sealth of cups stored in said magazine means.

References Cited by the Examiner

UNITED STATES PATENTS

| 581,194 | 4/1897 | Buerdsell | 221—113 |
| 1,159,245 | 11/1915 | Millard | 221—113 |

FOREIGN PATENTS 165,359  9/1955  Australia.

SAMUEL F. COLEMAN, *Primary Examiner.*